Patented Feb. 6, 1934

1,946,124

UNITED STATES PATENT OFFICE 1,946,124

NEUTRAL ADSORBENT AND PROCESS OF MAKING SAME

Daniel S. Belden and William Kelley, Los Angeles, Calif., assignors to Filtrol Company of California, Los Angeles, Calif., a corporation of California No Drawing. Application September 1, 1930
Serial No. 479,126

1 Claim. (Cl. 252—2)

In recent years, the so-called acid-activated types of clays have to a large extent superseded fuller's earth for animal and vegetable oil and fat decolorizing work. These excellent decolorizers are made by a process of treating certain clays with sulfuric acid followed by a washing treatment to eliminate the so-formed soluble salts. The most general method followed in such treatment is described in United States Patent No. 1,397,113 to P. W. Prutzman. Such activated clays, despite their splendid decolorizing efficiency, were open to the objection, upon organic fats at least, that their residual acidity had a noticeable fat-splitting activity. Long continued washing had consistently failed to eliminate these traces of acid, probably because the acid was adsorbed upon the surfaces or deeply lodged in the pores of the clay.

In order to solve the above stated problem, we conceived the idea of taking the finished product of the ordinary process of activating bentonitic clay according to the process of Patent No. 1,397,113 or variations thereof, and then heating the product thereof in a wet or dry condition with a substantial proportion of a finely divided untreated bentonitic clay or fuller's earth until a combined neutralizing and activating action took place, whereby the activated clay was neutralized and the raw clay activated, and the generated soluble salts were washed out. Only a re-drying was then necessary to make the clay a commercial product of high value.

In our process, we first activated a bentonitic clay high in smectite, as shown by its X-ray spectrum. This clay comes from a deposit near Chambers, Arizona, and is of lower initial adsorptive activity than fuller's earth. The activation process was substantially that described in U. S. Patent No. 1,397,113. The acidity of this product when air-dry, as tested by the Wendt electro-titration apparatus upon two grams in 200 c. c. of distilled water, was about $pH_3$.

In one of the modifications of our process, we heated the activated Chambers clay pulp before drying it, so that the pulp contained about from 25% to 33% of solids, with from 50% to 75% of the total weight of solids in the pulp, of a finely divided fuller's earth type clay in air-dry condition coming from the vicinity of Tehachapi, California. The mixture of air-dry clay and activated clay pulp was heated from one hour to three hours in a furnace of the multiple hearth type, the furnace being held at temperatures ranging from 170° F. to 600° F. It was found that the higher ranges of temperature gave the best results, probably the best being reached when the clay itself, due to the evaporation of its water content, did not exceed 600° F. The temperature should be regulated in accordance with the product desired. Some oils demand a more highly heat-treated product than others for best results. The entire charge of clay was then quenched in from three to five parts by weight of hot softened water and thoroughly agitated therein so that soluble salts were substantially entirely removed. The residual solid clay was then dried in a second furnace, either of the Herreshoff, rotary kiln, or other desirable type, to about 7% moisture and then packaged. The temperatures prevailing in the second furnace were not higher than those used in the neutralizing furnace.

In speaking of the "neutralizing" effect obtained in the first furnace, we are aware that this effect is probably not the ordinary one of a base combining with an acid. Such an explanation is excluded by the fact that the Tehachapi clay or fuller's earth used in the experiments was in some cases slightly acid when tested with the Wendt apparatus. Raw Tehachapi clay, when so tested, runs about $pH_4$. The "neutral" product, which is a subject of our invention, is also not absolutely neutral, but of from $pH_4$ to about $pH_6$. We are of the opinion that a reaction proceeds between the neutralizing clay and the activated clay pulp which is being neutralized, this reaction probably occurring through the adsorption of acid by the neutralizing clay from the acid-activated clay, followed by attack by the newly adsorbed acid or acid salts upon the fresh surfaces of the adsorbing particles. At any rate, a rise of temperature takes place, indicating a reaction of some sort. For this reason, the neutralizing furnace should be equipped with some sort of temperature controlling means, which the standard modern multiple hearth furnace has.

In another modification of our process we add from 1% to 5% by weight of free mineral acid, preferably $H_2SO_4$ of 66° Bé., to the pulp which consists of a mixture of already acid-activated clay, fuller's earth type clay, and water. The amount of acid to be added is calculated upon the dry weight of the solids in the pulp. The acid is thoroughly incorporated, and the acid pulp is then heated to between 212° F. and 600° F. in the neutralizing furnace. The clay is then washed, as before, to substantial neutrality. We find that there is a further gain in adsorptive efficiency resulting from the heating with acid and acid salts and that the reaction products resulting are very easily washed out so that the substantial neutrality of the product is not impaired by the acid treatment which it has received.

Our product is remarkable in that in ordinary use it will cause a decrease in the free fatty acids of an animal or vegetable oil or fat. This decrease has been as high as half of the free fatty acid present in the oil. It also has other notable effects, among which are to lessen the odor of the oil or fat treated and to preserve the latter for a longer time from rancidity. The "neutral" product has a superior decolorizing efficiency as compared to an activated clay made from the same materials in the same proportion by the "wet" process of Patent No. 1,397,113.

Not the least important feature of this invention is the large saving of acid that it effects. We have found that the "neutralizing" process activates the Tehachapi or fuller's earth type of clay more fully than treatment in the wet way with 14% to 50% of acid would do. A large consumption of acid is therefore avoided, since it will be remembered that our finished product contains from 50% to 75% of activiated Tehachapi or fuller's earth type of clay.

The above discussion as to clays is illustrative only. We have found that for the Chambers clay any activatable bentonite, montmorillonite, or smectite might be substituted, while for the neutralizing or Tehachapi clay the mentioned kinds of clay in unactivated condition, or ordinary fuller's earth might be substituted. For the activated clay we prefer to use a material having no initial decolorizing activity, while for the neutralizing clay we prefer a material having considerable initial decolorizing power.

We claim as our invention:

The method of producing a material for decolorizing vegetable oils and organic oils and fats which consists in mixing a quantity of activated clay pulp with a substantial proportion of finely divided clay in air-dry condition, heating the mixture at from 212° F. to 600° F. until an exothermic reaction occurs, then quenching the mixture in from three to five parts by weight of hot softened water and thoroughly agitating the mixture so as to remove the soluble salts therefrom, and then drying the mixture.

DANIEL S. BELDEN.
WILLIAM KELLEY.